United States Patent
Faoro et al.

(10) Patent No.: US 10,550,449 B2
(45) Date of Patent: Feb. 4, 2020

(54) APPARATUS AND PROCESS FOR SEPARATING AND RECOVERING THE COMPONENTS OF AN ALLOY, PARTICULARLY A NOBLE ALLOY

(71) Applicants: IKOI S.R.L., Cassola (IT); LLC "ENFMPP—ENGINEERING", Ekaterinburg (RU)

(72) Inventors: Giovanni Faoro, Dassano del Grappa (IT); Aleksandr Khlebnikov, Ekaterinburg (RU); Denis Borovkov, Nizhniy Tagil (RU); Sergey Medvedev, Moscow (RU); Sergey Grokhovsky, Ekaterinbug (RU)

(73) Assignee: IKOI S.P.A., Cassola (IT)

( * ) Notice: Subject to any disclaimer, the term of this patent is extended or adjusted under 35 U.S.C. 154(b) by 0 days.

(21) Appl. No.: 15/550,195

(22) PCT Filed: Jan. 25, 2016

(86) PCT No.: PCT/EP2016/000121
§ 371 (c)(1),
(2) Date: Aug. 10, 2017

(87) PCT Pub. No.: WO2016/128109
PCT Pub. Date: Aug. 18, 2016

(65) Prior Publication Data
US 2018/0030570 A1 Feb. 1, 2018

(30) Foreign Application Priority Data
Feb. 12, 2015 (IT) .................. VI2015A0038

(51) Int. Cl.
C22B 9/02 (2006.01)
C22B 9/04 (2006.01)
F27B 5/04 (2006.01)
F27B 5/06 (2006.01)

(52) U.S. Cl.
CPC .................. *C22B 9/02* (2013.01); *C22B 9/04* (2013.01); *F27B 5/04* (2013.01); *F27B 5/06* (2013.01); *F27B 2005/062* (2013.01)

(58) Field of Classification Search
CPC ..... C22B 9/02; C22B 9/04; F27B 5/04; F27B 5/06
See application file for complete search history.

(56) References Cited

U.S. PATENT DOCUMENTS

| 3,136,627 A | * | 6/1964 | Caldwell, Jr. ............. C22B 5/16 118/724 |
| 2003/0025253 A1 | * | 2/2003 | Popov ..................... C22B 7/003 266/208 |

FOREIGN PATENT DOCUMENTS

| CN | 201416028 | 3/2010 |
| CN | 102676828 | 9/2012 |

(Continued)

OTHER PUBLICATIONS

Zhan, Lu and Zhenming Xu. "Application of Vacuum Metallurgy to Separate Pure Metal from Mixed Metallic Particles of Crushed Waste Printed Circuit Board Scraps." Environmental Science Technology. vol. 42. pp. 7676-7681. (Year: 2008).*

(Continued)

*Primary Examiner* — Tima M. McGuthry-Banks
(74) *Attorney, Agent, or Firm* — Duane Morris LLP; Gregory M. Lefkowitz; Jason M. Nolan

(57) ABSTRACT

An apparatus for separating and recovering the components of an alloy, particularly a noble alloy, including a high vacuum chamber housing at least one crucible for the alloy to be separated; at least one heating element arranged, during use, around the crucible; at least one condensation device, which faces, during use, an upper mouth of the crucible. The particularity of the present invention resides in that the condensation device includes at least one cold (Continued)

element and at least one deflector that is adapted to divert the flow of the aeriform substances derived from the melting and evaporation of the alloy toward the cold element. The invention also relates to a process for separating and recovering the components of an alloy, particularly a noble alloy.

20 Claims, 5 Drawing Sheets

(56) References Cited

FOREIGN PATENT DOCUMENTS

| | | | | |
|---|---|---|---|---|
| CN | 203123606 | | 8/2013 | |
| CN | 103484681 | | 1/2014 | |
| CN | 103924086 | | 7/2014 | |
| CN | 103924087 | | 7/2014 | |
| CN | 104018000 | | 9/2014 | |
| EP | 3029165 A1 | * | 6/2016 | ............ C22B 9/02 |
| JP | H09256083 | | 9/1997 | |
| KR | 20110075106 | | 7/2011 | |
| RU | 94030847 | | 6/1996 | |
| RU | 2324747 | | 5/2008 | |
| WO | 2015016732 | | 2/2015 | |
| WO | WO 2015016732 | * | 3/2015 | |

OTHER PUBLICATIONS

WO 2015016732 A1 machine translation of the description (Year: 2015).*

ESPACENET family data for WO 2015016732 A1 & EP 3029165 A1 (Year: 2015).*

* cited by examiner

APPARATUS AND PROCESS FOR SEPARATING AND RECOVERING THE COMPONENTS OF AN ALLOY, PARTICULARLY A NOBLE ALLOY

CROSS-REFERENCE TO RELATED APPLICATIONS

This application is a § 371 national stage entry of International Application No. PCT/EP2016/000121, filed Jan. 25, 2016, which claims priority to Italian Patent Application VI2015A000038, filed Feb. 12, 2015, the entire contents of which are incorporated herein by reference.

The present invention relates to an apparatus and a process for separating and recovering the components of an alloy, particularly a noble alloy.

Several separation processes are known in the art for separating and recovering the various elements that compose an alloy.

In particular, several refinement processes are known for separating gold and other noble metals from the non-noble materials to which they are bonded or with which they are mixed, such as primary minerals or production waste.

Those refinement processes are generally performed by means of apparatuses and procedures that use chemical reagents; accordingly, although they are used routinely, they have quite a few critical aspects linked to safety problems, pollution risks and health protection in workplaces.

Also, the known processes may be so expensive as to be practically inaccessible to medium and small manufacturers.

In an attempt to solve the problems described above, some separation processes have been recently devised which utilize vacuum distillation systems and do require the use of chemical reagents.

More particularly, those systems generally include a crucible that is arranged inside a hermetically sealed enclosure, in which vacuum is created. The enclosure also accommodates a device capable of condensing the aeriform substances derived from the melting of the material contained in the crucible, in order to allow their recovery. Melting is generally achieved by using inductors powered by electric generators or by means of other heating elements.

The condensing device is generally constituted by a cup-shaped body, which is cooled and is arranged with its concavity directed toward the upper opening of the crucible.

In some cases, traps are provided on the concave surface of the condenser in order to facilitate the deposition of the aeriform substances that contain the materials to be recovered.

Although the above described systems are advantageous with respect to those of the chemical type, they still have aspects that can be improved.

In the absence of a precise orientation of their flow, the aeriform substances that originate from the crucible tend to deposit all in the same region above the crucible and thereby create a plug or otherwise fall back into the crucible, thus limiting the efficiency of the process.

Also, the condensation area is normally constituted by a concave surface from which the already mentioned traps protrude; such a configuration creates considerable difficulties in the operations for recovering the material that has deposited thereon.

Another unfavorable aspect is that there is a considerable exchange of heat by radiation to which the deposited metal is subjected; this fact may make it difficult to separate low-melting elements.

The aim of the present invention is to provide an apparatus and a process for separating and recovering the components of an alloy, particularly a noble alloy, that allow to solve the drawbacks of the prior art systems.

Within the scope of this aim, a particular object of the invention is to provide an apparatus and a process that allow to perform a reliable and effective control of the flows of aeriform substances deriving from the melting of the material contained in the crucible, and to concentrate the substances on the condensation devices.

Another object of the invention is to provide an apparatus and a process that is capable of maximizing the quantity of recovered material.

Another object of the invention is to provide an apparatus and a process that facilitate the recovery of the material deposited on the condensation device.

A further object of the invention is to provide an apparatus and a process that allow to treat noble metals of various types originating from various processes, such as for example the ones classified as goldsmith-silversmith waste, electronic waste, dental waste, or waste derived from mining products, or others.

Another object of the invention is to provide an apparatus and a process that have minimal environmental impact.

Another object of the invention is to provide an apparatus and a process that allow to reduce the energy consumption and processing times.

This aim, as well as these and other objects that will become better apparent hereinafter, are achieved by an apparatus for separating and recovering the components of an alloy, particularly a noble alloy, comprising a high vacuum chamber housing at least one crucible for the alloy to be separated; at least one heating element arranged, during use, around said crucible; at least one condensation device, which faces, during use, an upper mouth of said crucible; said apparatus being characterized in that said condensation device comprises at least one cold element and at least one deflector that diverts the flow of the aeriform substances derived from the melting and evaporation of said alloy toward said cold element.

This aim and these objects are also achieved by a process for separating and recovering the components of an alloy, particularly a noble alloy, in which the alloy to be separated is melted, by means of a heating element, in a crucible accommodated inside a high vacuum chamber provided with one or more condensation devices adapted to condense the aeriform substances derived from the melting of the alloy, characterized in that it implements an iterative procedure which includes at least the following steps:

arranging the crucible below an n-th condensation device;

bringing the alloy to an n-th temperature value and creating inside the high vacuum chamber an n-th degree of vacuum, so as to cause the evaporation of the components of the alloy with an n-th degree of volatility;

after an n-th time interval, such as to allow the substantially complete evaporation of the components with n-th degree of volatility, lowering the temperature of the alloy and lowering the degree of vacuum inside the high vacuum chamber, so as to inhibit the evaporation of the components of the alloy;

repeating the procedure, starting from the first step, for each condensation device;

lowering further the temperature of the alloy and eliminating the vacuum inside the high vacuum chamber;

recovering from the walls of each condensation device the components of the alloy with corresponding degree of volatility;

recovering from the crucible the non-evaporated components of the alloy.

Further characteristics and advantages will become better apparent from the description of preferred but not exclusive embodiments of an apparatus according to the invention, illustrated by way of non-limiting example in the accompanying drawings, wherein.

Figure 1:
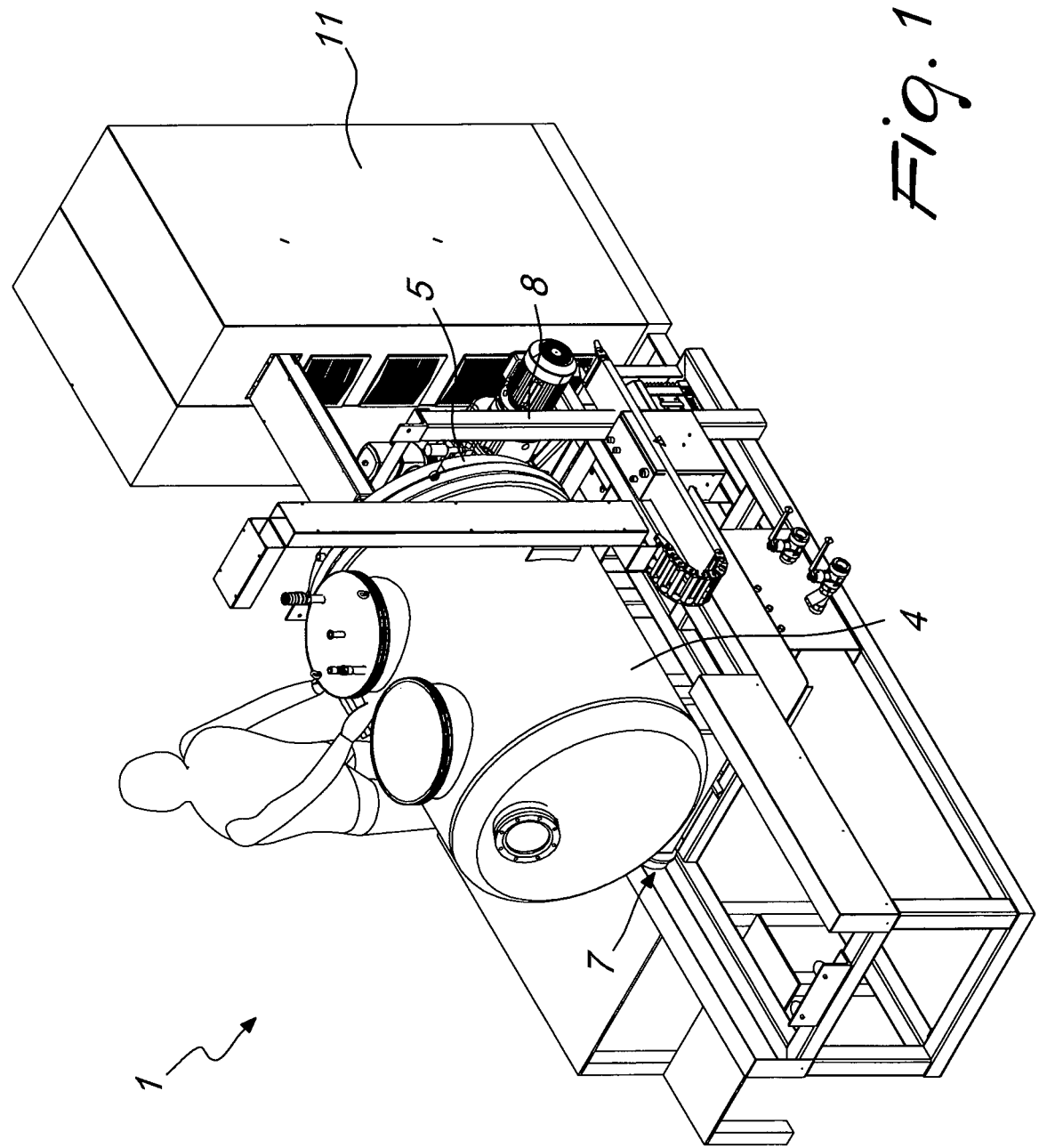
FIG. 1 is a perspective view of an apparatus according to the invention.
Figure 2:
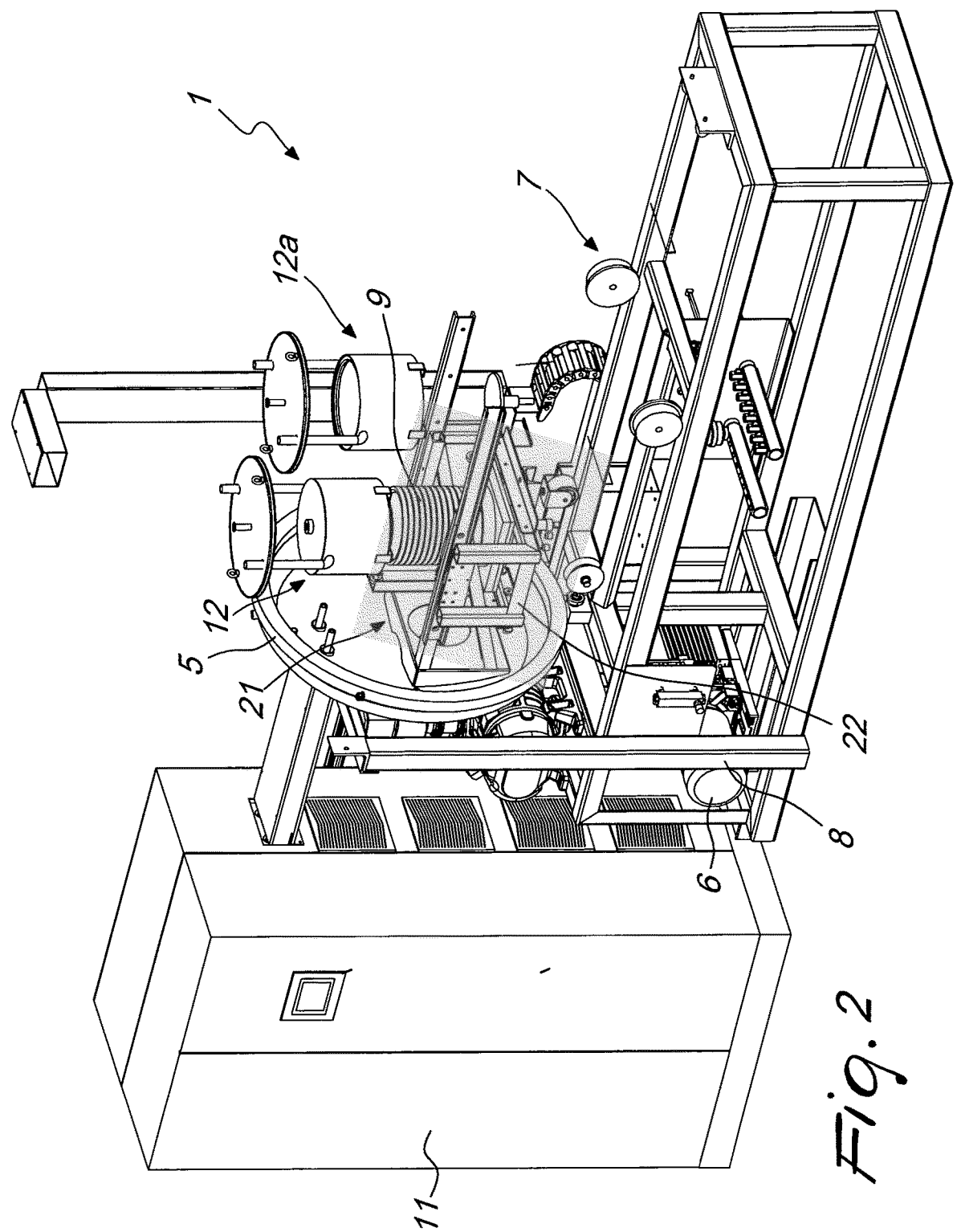
FIG. 2 is a cutout perspective view of the apparatus according to the invention.
Figure 3:
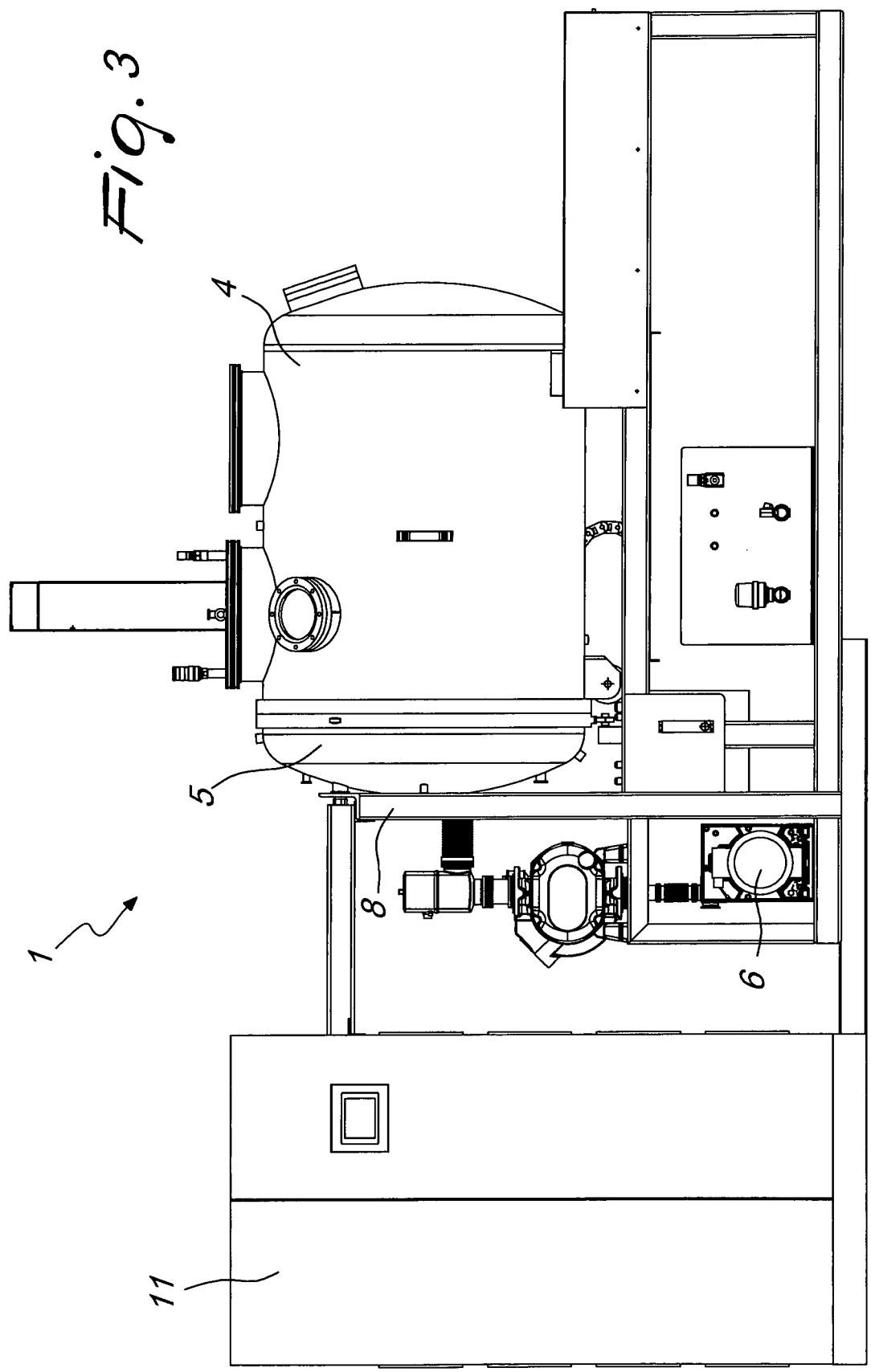
FIG. 3 is a side view of the apparatus according to the invention.
Figure 4:
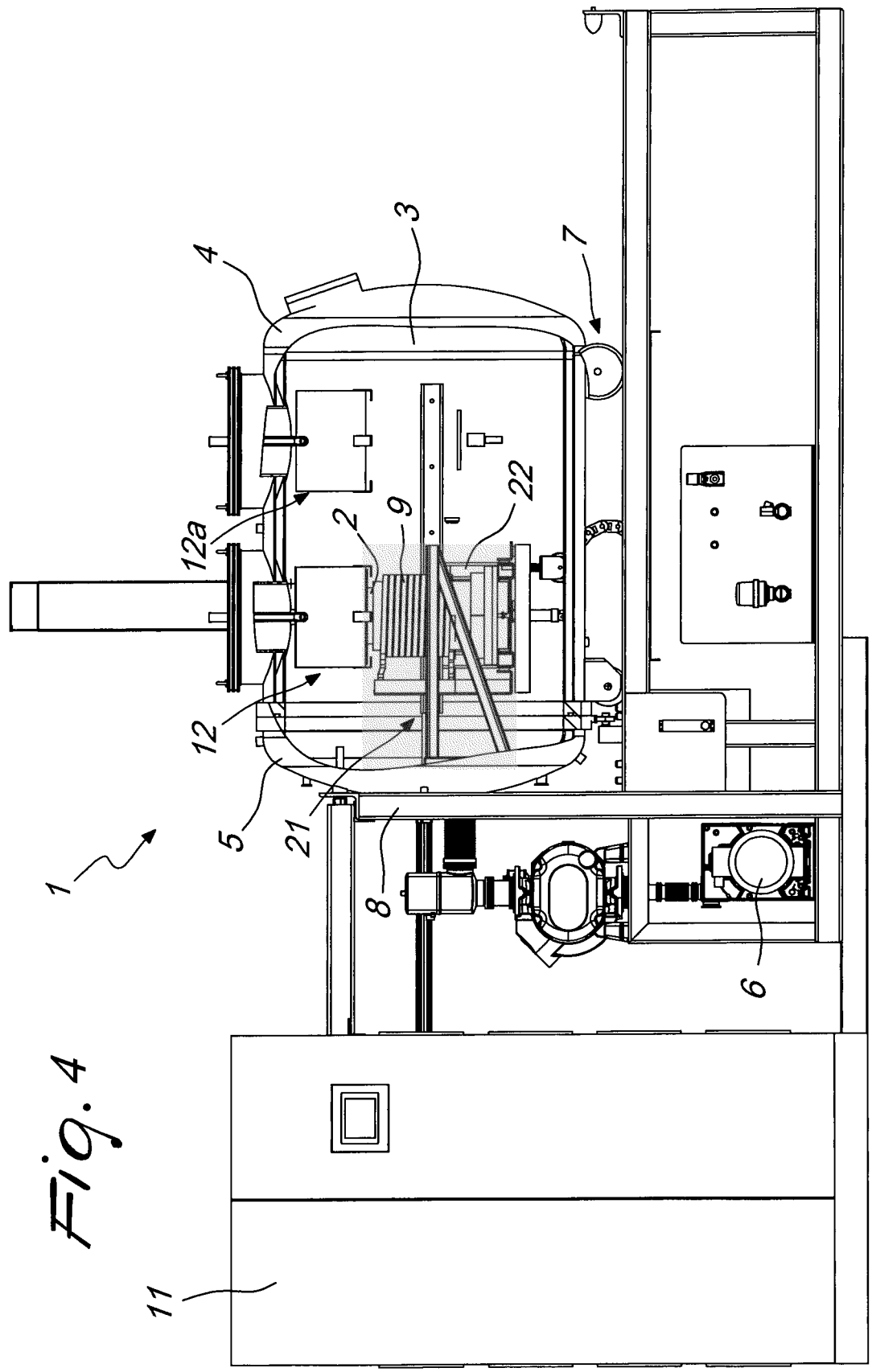
FIG. 4 is a cutout side view of the apparatus according to the invention.
Figure 5:
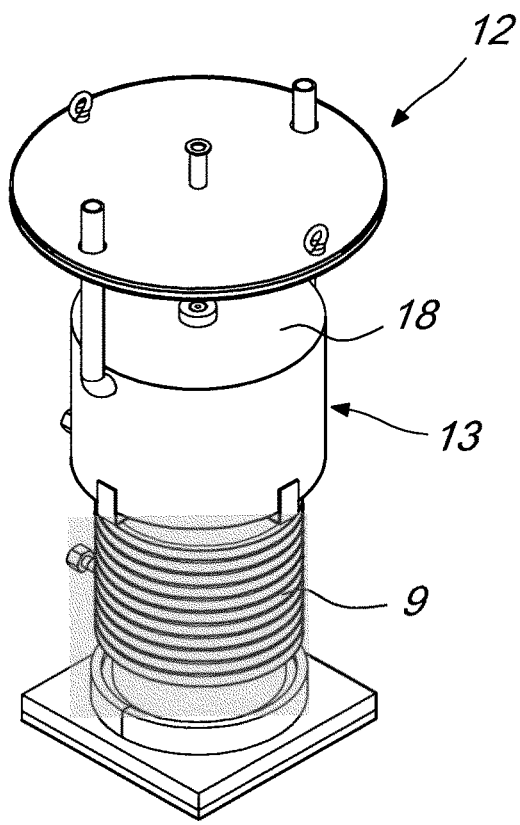
FIG. 5 is a perspective view of a component of the apparatus according to the invention.
Figure 6:
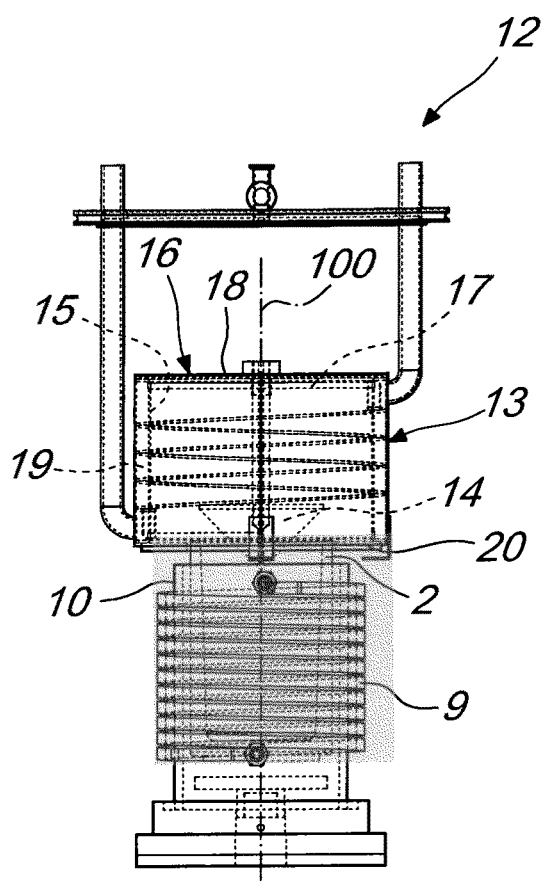
FIG. 6 is a cutout side view of the component of the preceding figure.
Figure 7:
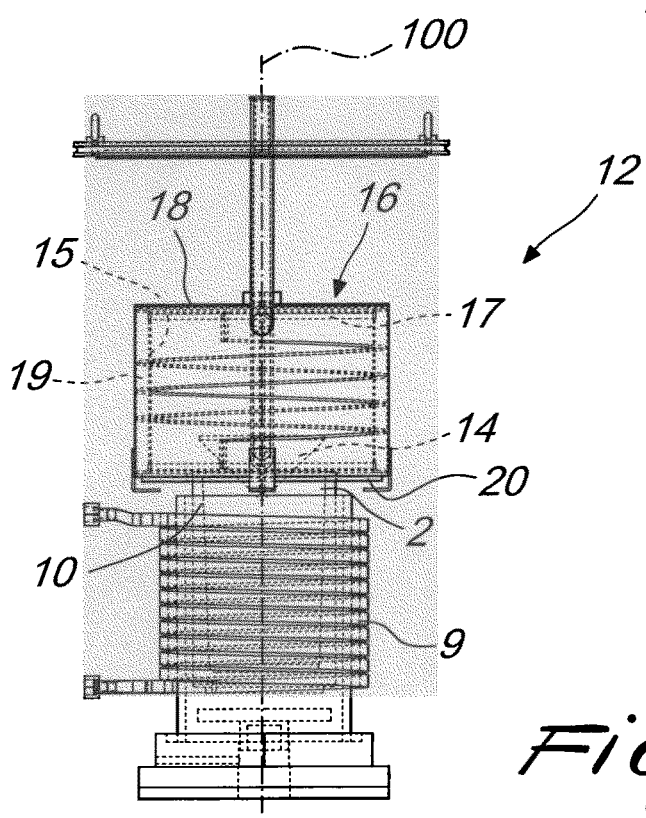
FIG. 7 is another cutout side view of the component of FIG. 5.

With reference to the cited figures, an apparatus for separating and recovering the components of an alloy, in particular a noble alloy, is generally designated by the reference numeral 1.

The apparatus 1 has at least one crucible 2 for containing the alloy to be separated. The crucible 2 is preferably made of graphite, zirconia (zirconium dioxide) or other materials suitable for this use, and is removably accommodated in a high vacuum chamber 3.

The high vacuum chamber 3 is delimited by an enclosure 4 and by a lid 5, which are preferably made of steel and are generally hermetically coupled.

The apparatus 1 also has a vacuum means 6 for generating vacuum in the enclosure 4, when it is closed hermetically, and a moving means 7 for moving the enclosure 4 away from the lid 5, so as to allow access to the crucible 2.

In the illustrated embodiment, the lid 5 is fastened to a supporting structure 8 while the enclosure 4 is mounted so that it can move horizontally on the supporting structure 8, so that the enclosure 4 may be moved away from, or toward, the lid 5.

According to further embodiments of the invention, the enclosure 4 may be stationary and the lid 5 may be movable with respect to the enclosure 4. In any case, the relative motion of the above components occurs along a substantially vertical direction.

According to a further embodiment of the invention, not shown in the figures, the apparatus 1 also includes mechanical motion means for facilitating the relative movements between the lid 5 and the enclosure 4.

The apparatus 1 also includes a heating element, which is advantageously constituted by at least one inductor 9 that is arranged, during use, inside the crucible 2 with the interposition of a cylindrical shield 10, made of refractory material or of another material with equivalent characteristics.

The presence of the cylindrical shield 10 allows to limit the exchanges due to radiation, which otherwise would be a very significant fraction of the thermal losses in the crucible 2.

Conveniently, the inductor 9 is connected to an electric power supply means, contained in a cabinet 11 that also accommodates a suitable control means.

According to a further embodiment of the invention, not shown in the figures, the assembly formed by the crucible 2, by the inductor 9 and by the interposed cylindrical shield 10 can be turned over about a substantially horizontal oscillation axis so as to facilitate the extraction of the material contained in the crucible 2.

According to the illustrated embodiment, the apparatus 1 is also provided with two condensation devices, designated respectively by the reference numerals 12 and 12a. An upper mouth of the crucible 2 alternately faces the condensation devices 12 and 12a. However, it is evident to the person skilled in the art, that the apparatus according to the present invention may have an indefinite number of condensation devices.

Only the first condensation device 12 will be described hereinafter by way of example, it being understood that the second condensation device 12a and any other condensation device optionally mounted on the apparatus according to the invention is analogous.

Each condensation device has shapes and proportions designed so as to optimize the capture of the vapors of components of the alloy with specific characteristics and with a specific degree of volatility.

According to the invention, the condensation device 12 includes a cold element 13, advantageously constituted by a hollow body, and a deflector 14, which is adapted to laterally disperse the aeriform substances produced by the melting and evaporation of the alloy to be separated, redirecting their flow toward the internal lateral walls of the cold element 13.

According to a preferred embodiment, the cold element 13 is formed by a first lateral wall 15, which is substantially cylindrical and forms an exchange surface that is cooled by cooling fluid that is fed by a cooling means, not shown in the figures. The first lateral wall 15 has an interspace provided with helical channels 19 inside which the cooling fluid flows.

According to a further embodiment of the invention, not shown in the figures, the interspace and the channels 19 are replaced by coils that are provided in the first lateral wall 15 or are associated with the lateral wall 15 and, for example, are shaped as a cylindrical helix.

The first lateral wall 15 is closed by an upper wall 16, which is advantageously constituted by a first plate 17, which preferably consists of a disk made of refractory metal which is coupled to a second plate 18 made of steel.

The first plate 17 is directed toward the inside of the cold element 13 and further contributes to limit the exchanges caused by radiation.

According to a further embodiment of the invention, not shown in the figures, a second lateral wall may be detachably accommodated inside the first lateral wall 15; the second lateral wall is arranged coaxially to the axis of symmetry 100 of the cold element 13.

In practice, this second lateral wall is intended to act as a deposition substrate for the material that condenses inside the cold element 13 in order to facilitate its recovery.

According to a preferred embodiment of the invention, the deflector 14 is constituted by a substantially conical body, made of graphite or other material with equivalent characteristics, which is arranged substantially at the axis of symmetry 100 of the cold element 13, with its vertex directed toward the crucible 2.

According to a further aspect of the invention, the defector 14 is constituted by a body at least partially delimited by a quadric surface; in other words, the deflector 14 may be constituted for example by a portion of a paraboloid of rotation, of a hyperboloid, of a spheroid, of an ellipsoid, and others. The deflector 14 is made of graphite or other material with equivalent characteristics and is arranged so that the convex part is directed toward the crucible 2.

Advantageously, the deflector 14 can move vertically, along the direction identified by the axis of symmetry 100, so as to vary its distance from the crucible 2 until it protrudes beyond the lower edge of the first lateral wall 15 and projects at least partially into the upper mouth of the crucible 2.

In a similar manner, the deflector 14 can also be raised until it rests on the upper wall 16.

The motion of the deflector 14 is automatically managed by the already cited control means and, during the entire process, the position of the deflector is changed according to a precise program.

According to a further aspect of the invention, the apparatus 1 also includes a heating means, of a per se known type and not shown in the figures, which allows to raise the temperature of the deflector 14.

According to a further aspect of the invention, the apparatus 1 also includes a first annular shield 20, which is made of refractory material or other material with equivalent characteristics and is arranged substantially at the lower edge of the first side wall 15, in order to limit the dispersion of the aeriform substances derived from the melting and evaporation of the material to be treated outside the condensation device 12.

In practice, the first annular shield 20 fills the empty space between the upper mouth of the crucible 2 and the first lateral wall 15.

According to a further aspect of the invention, the apparatus 1 also includes a second annular shield, not shown in the figures; the second annular shield is arranged substantially at the upper mouth of the crucible 2 and faces the first annular shield 20 in order to reduce further the dispersion of aeriform substances outside the condensation device 12.

According to a further aspect of the invention, the apparatus 1 also includes a system for continuous weighing, not shown in the figures, which is associated with the crucible 2.

According to a further aspect of the invention, the apparatus 1 includes a handling means 21, which allows to move the crucible 2 both along a substantially horizontal direction and along a substantially vertical direction.

In the illustrated embodiment, the handling means 21 has a frame 22 that can move so as to shift the crucible 2 from a first position, in which the upper mouth of the latter faces the first condensation device 12, to a second position, in which the upper mouth of the crucible 2 faces the second condensation device 12a.

According to a further aspect of the invention, which is not illustrated in the figures, the crucible 2 remains in a substantially fixed position while the condensation devices move.

The present invention also relates to a process for the separation and recovery of the components of an alloy, particularly a noble alloy.

This process can be performed by means of any system suitable for the purpose, but it is preferably performed by means of the apparatus that is the subject matter of the present patent application.

According to the process of the present invention, the alloy to be separated is melted, for example by means of electromagnetic induction or other means, inside a crucible arranged within a high vacuum chamber that is provided with one or more condensation devices that are suitable to condense the aeriform substances deriving from the melting and evaporation of the alloy.

Assuming the presence of a plurality of condensation devices, each of which can be identified with its own index n, the process according to the invention provides for the implementation of an iterative procedure, which must be repeated at least partially for each condensation device.

In particular, this procedure initially provides for arranging the crucible below an n-th condensation device.

At this point, the alloy is brought to an n-th temperature value and simultaneously an n-th degree of vacuum is created in the high vacuum chamber, so as to cause the evaporation of the components of the alloy with the n-th degree of volatility.

After an n-th time interval, such as to allow the substantially complete evaporation of the components with n-th degree of volatility, both the temperature of the alloy and the degree of vacuum inside the high vacuum chamber are lowered so as to inhibits the evaporation of substantially all the components of the alloy.

In practice, the n-th time interval mentioned above can be determined by the control means, for example by means of the continuous weighing system, if present.

In fact, if the weight of the components of the alloy with n-th degree of volatility is known from the start, it is possible to continuously compare this weight with the weight loss detected by the weighing system during the evaporation process.

When the two values substantially coincide, it is possible to consider the evaporation of the components with n-th degree of volatility to be complete.

The procedure described so far is then repeated, starting from the beginning, as regards each condensation device.

In this regard, it should be noted that the procedure provides for the index n to vary increasingly from 1 to the total number of condensation devices that are present. Also, each n-th temperature value is greater than the (n−1)-th temperature and likewise each n-th degree of vacuum is greater than the (n−1)-th degree of vacuum.

When all the condensation devices have been affected by the process, the temperature of the alloy is reduced further and at the same time vacuum inside the high vacuum chamber is eliminated.

At this point it is possible to recover the components of the alloy with the corresponding degree of volatility, from the walls of each condensation device.

For example, it is possible to recover the components of the alloy that have a first degree of volatility, from the walls of the first condensation device, it is possible to recover the components of the alloy that have a second degree of volatility, from the walls of the second condensation device, and so forth.

The non-evaporated components of the alloy are instead recovered from the crucible.

The above described process may be advantageously implemented with the apparatus 1 having a first condensation device 12 and a second condensation device 12a.

In this case, the process begins with a first step wherein the crucible 2, which contains the alloy to be separated, is arranged below the first condensation device 12.

At this point the alloy is brought to a first temperature value by means of the heating element, creating simultaneously a first degree of vacuum inside the high vacuum chamber 3.

The first temperature value and the first degree of vacuum are set in such a manner as to cause the melting of the alloy and the evaporation of the components with a first degree of volatility, in this case the more volatile components.

After a first time interval, such as to allow the substantially complete evaporation of the more volatile components, both the temperature of the alloy and the degree of vacuum inside the high vacuum chamber 3 are lowered so as to inhibit the evaporation of substantially all the components of the alloy.

When the temperature has dropped enough, the crucible 2 is moved below the second condensation device 12a and the temperature is raised again together with the degree of vacuum.

In greater detail, the alloy to be separated is brought to a second temperature value, which is higher than the first temperature value, and a second degree of vacuum, higher than the first degree of vacuum, is created inside the high vacuum chamber 3, so as to cause the evaporation also of the components with a second degree of volatility, in this case the less volatile components.

After a second time interval, such as to allow the substantially complete evaporation also of the less volatile components, the alloy is brought to a temperature and a degree of vacuum such as to inhibit its evaporation and allow its recovery from the crucible 2.

At this point it is possible to open the high vacuum chamber 3, extract the first condensation device 12 and recover the more volatile components of the alloy that have been deposited on its lateral walls.

The less volatile components of the alloy are instead recovered from the lateral walls of the second condensation device 12a, on which they are deposited, after extraction of the device from the high vacuum chamber 3.

The components of the alloy that have not evaporated during the process remain inside the crucible 2, from which they can be conveniently recovered.

The crucible 2 is moved by means of the handling means 21, which is controlled by the already cited control means.

On the basis of what has been described, it is evident that, by means of the apparatus 1, it is possible to implement a particularly effective process for separating and recovering the components of an alloy.

This process provides for the use of suitable condensation devices, each of which can be used to extract and recover elements of an alloy with precise volatility characteristics, utilizing for each condensation device a suitable combination of the temperature of the alloy and of the degree of vacuum to which it is subjected.

In addition to this, the innovative shape of the condensation devices facilitates the separation and recovery of the components of the alloy, by having deflectors suitable to divert the flow of the aeriform substances, deriving from the melting and evaporation of the alloy placed in the crucible, toward the internal lateral walls of the condensation devices.

Also, these condensation devices have a large and uniform deposition surface, which allows to maximize the quantity of recovered material, also facilitating the operations required for recovery.

The shields of the apparatus according to the invention greatly limit the losses due to radiation and therefore allow to reduce the energy consumption.

In practice it has been found that the apparatus and the process for separating and recovering the components of an alloy, particularly a noble alloy, according to the invention, fully achieve the intended aim.

This application claims the priority of Italian Patent Application No. VI2015A000038, filed on Feb. 12, 2015, the subject matter of which is incorporated herein by reference.

The invention claimed is:

1. A process for separating and recovering components of an alloy, wherein the alloy comprises at least two components having different degrees of volatility, the process comprising:
   providing an apparatus to melt the alloy, the apparatus comprising a heating element, a crucible that is accommodated inside a vacuum chamber provided with one or more condensation devices, wherein each one of said condensation devices comprises at least one cold element and at least one deflector that laterally diverts aeriform substances derived from the melting of said alloy; wherein said deflector is movable along an axis of symmetry of said cold element and able to vary its distance from an upper mouth of said crucible;
   separating and recovering the components of the alloy by an iterative procedure which comprises at least the following steps:
      arranging said crucible below an n-th condensation device;
      bringing said alloy to an n-th temperature value and creating inside said vacuum chamber an n-th degree of vacuum, so as to cause evaporation of components of said alloy with n-th degree of volatility;
      after an n-th time interval, which provides a substantially complete evaporation of said components with n-th degree of volatility, lowering the temperature of said alloy and lowering the degree of vacuum inside said vacuum chamber, so as to inhibit evaporation of additional components of said alloy;
      repeating said procedure, starting from the arranging step, for each condensation device;
      lowering further the temperature of said alloy and eliminating the vacuum inside said vacuum chamber;
      recovering from walls of each condensation device components of said alloy; and
      recovering from said crucible the non-evaporated components of said alloy.

2. The process according to claim 1, wherein index n varies increasingly from 1 to the total number of condensation devices that are present; each n-th temperature value being greater than the (n−1)-th temperature value; each n-th degree of vacuum being greater than the (n−1)-th degree of vacuum.

3. The process according to claim 2, wherein said n-th time interval, allowing the substantially complete evaporation of said components with n-th degree of volatility, is automatically calculated by a control means that interacts with a continuous weighing system; said control means being adapted to compare a weight loss detected by said continuous weighing system regarding said components with n-th degree of volatility with the known weight of said components with n-th degree of volatility.

4. The process according to claim 1, wherein said deflector is adapted to project at least partially inside said upper mouth of said crucible.

5. The process according to claim 1, wherein the apparatus to melt the alloy further comprises a handling means adapted to move said crucible along a substantially horizontal direction and along a substantially vertical direction.

6. A process for separating and recovering components of an alloy, wherein the alloy comprises at least two components having different degrees of volatility, the process comprising:
   providing an apparatus to melt the alloy, the apparatus comprising: a vacuum chamber housing at least one crucible for the alloy to be separated; at least one heating element arranged around said crucible; at least one condensation device, which faces an upper mouth of said crucible; said at least one condensation device comprising at least one cold element and at least one deflector that laterally diverts aeriform substances derived from said alloy toward said cold element; wherein said deflector comprises a substantially conical body, which is arranged substantially at an axis of symmetry of said cold element and having a vertex directed toward said crucible;

arranging said crucible below an n-th condensation device;

bringing said alloy to an n-th temperature value and creating inside said vacuum chamber an n-th degree of vacuum, so as to cause evaporation of the components of said alloy with n-th degree of volatility;

after an n-th time interval, which provides a substantially complete evaporation of said components with n-th degree of volatility, lowering the temperature of said alloy and lowering the degree of vacuum inside said vacuum chamber, so as to inhibit evaporation of additional components of said alloy;

repeating, for each condensation device, said process starting from the arranging said crucible below an n-th condensation device;

lowering further the temperature of said alloy and eliminating the vacuum inside said vacuum chamber;

recovering from walls of each condensation device the components of said alloy; and recovering from said crucible the non-evaporated components of said alloy.

7. The process according to claim 6, wherein index n varies increasingly from 1 to the total number of condensation devices that are present; each n-th temperature value being greater than the (n−1)-th temperature value; each n-th degree of vacuum being greater than the (n−1)-th degree of vacuum.

8. The process according to claim 7, wherein said n-th time interval, allowing the substantially complete evaporation of said components with n-th degree of volatility, is automatically calculated by a control means that interacts with a continuous weighing system; said control means being adapted to compare a weight loss detected by said continuous weighing system regarding said components with n-th degree of volatility with the known weight of said components with n-th degree of volatility.

9. The process according to claim 6, wherein the apparatus to melt the alloy further comprises a handling means adapted to move said crucible along a substantially horizontal direction and along a substantially vertical direction.

10. The process according to claim 6, wherein said deflector is movable along the axis of symmetry of said cold element and able to vary its distance from an upper mouth of said crucible.

11. A process for separating and recovering components of an alloy, wherein the alloy comprises at least two components having different degrees of volatility, the process comprising:

providing an apparatus to melt the alloy, the apparatus comprising: a vacuum chamber housing at least one crucible for the alloy to be separated; at least one heating element arranged around said crucible; at least one condensation device, which faces an upper mouth of said crucible; said at least one condensation device comprising at least one cold element and at least one deflector that laterally diverts aeriform substances derived from said alloy toward said cold element; a handling means adapted to move said crucible along a substantially horizontal direction and along a substantially vertical direction;

arranging said crucible below an n-th condensation device;

bringing said alloy to an n-th temperature value and creating inside said vacuum chamber an n-th degree of vacuum, so as to cause evaporation of the components of said alloy with n-th degree of volatility;

after an n-th time interval, which provides a substantially complete evaporation of said components with n-th degree of volatility, lowering the temperature of said alloy and lowering the degree of vacuum inside said vacuum chamber, so as to inhibit evaporation of additional components of said alloy;

repeating, for each condensation device, said process starting from the arranging said crucible below an n-th condensation device;

lowering further the temperature of said alloy and eliminating the vacuum inside said vacuum chamber;

recovering from walls of each condensation device the components of said alloy; and recovering from said crucible the non-evaporated components of said alloy.

12. The process according to claim 11, wherein index n varies increasingly from 1 to the total number of condensation devices that are present; each n-th temperature value being greater than the (n−1)-th temperature value; each n-th degree of vacuum being greater than the (n−1)-th degree of vacuum.

13. The process according to claim 12, wherein said n-th time interval, allowing the substantially complete evaporation of said components with n-th degree of volatility, is automatically calculated by a control means that interacts with a continuous weighing system; said control means being adapted to compare a weight loss detected by said continuous weighing system regarding said components with n-th degree of volatility with the known weight of said components with n-th degree of volatility.

14. The process according to claim 13, wherein said at least one condensation device comprising the at least one cold element and the at least one deflector adapted to laterally divert the flow of the aeriform substances derived from said alloy are diverted toward one or more walls of said cold element.

15. The process according to claim 14, wherein said deflector is moveable along an axis of symmetry of said cold element and able to vary its distance from an upper mouth of said crucible.

16. The process according to claim 14, wherein said deflector is adapted to project at least partially inside said upper mouth of said crucible.

17. The process according to claim 11, wherein said deflector is adapted to project at least partially inside said upper mouth of said crucible.

18. A process for separating and recovering components of an alloy, wherein the alloy comprises at least two components having different degrees of volatility, the process comprising:

providing an apparatus to melt the alloy, the apparatus comprising: a vacuum chamber housing at least one crucible for the alloy to be separated; at least one heating element arranged around said crucible; at least one condensation device, which faces an upper mouth of said crucible;

arranging said crucible below an n-th condensation device;

bringing said alloy to an n-th temperature value and creating inside said vacuum chamber an n-th degree of vacuum, so as to cause the evaporation of the components of said alloy with n-th degree of volatility;

after an n-th time interval, which provides a substantially complete evaporation of said components with n-th degree of volatility, lowering the temperature of said alloy and lowering the degree of vacuum inside said vacuum chamber to inhibit evaporation of additional components of said alloy;

wherein said n-th time interval is automatically calculated by a control means that interacts with a system configured to continuously weigh the crucible; said control means being adapted to compare a weight loss detected by said system for continuously weighing the crucible regarding said components with n-th degree of volatility with the known weight of said components with n-th degree of volatility;

repeating, for each condensation device, said process starting from the arranging said crucible below an n-th condensation device;

lowering further the temperature of said alloy and eliminating the vacuum inside said vacuum chamber;

recovering from walls of each condensation device the components of said alloy; and recovering from said crucible the non-evaporated components of said alloy.

19. The process according to claim 18, wherein index n varies increasingly from 1 to the total number of condensation devices that are present; each n-th temperature value being greater than the (n−1)-th temperature value; each n-th degree of vacuum being greater than the (n−1)-th degree of vacuum.

20. The process according to claim 18, wherein the apparatus to melt the alloy further comprises a handling means adapted to move said crucible along a substantially horizontal direction and along a substantially vertical direction.

* * * * *